United States Patent
Grant et al.

[11] Patent Number: 5,879,644
[45] Date of Patent: Mar. 9, 1999

[54] INTERSEPARATION OF PLATINUM GROUP METALS

[75] Inventors: Richard A. Grant, Caversham; Yvonne Taylor, Maidenhead, both of United Kingdom

[73] Assignee: Matthey Rustenburg Refiners (PTY) Limited, Transvaal, South Africa

[21] Appl. No.: 873,931

[22] Filed: Jun. 12, 1997

Related U.S. Application Data

[63] Continuation of Ser. No. 682,913, Jul. 16, 1996, abandoned.

[30] Foreign Application Priority Data

Jul. 25, 1995 [GB] United Kingdom ............... 9515196

[51] Int. Cl.$^6$ ............................................. C22B 11/00
[52] U.S. Cl. ................................... 423/22; 210/635
[58] Field of Search ..................... 423/22; 210/635, 210/656

[56] References Cited

U.S. PATENT DOCUMENTS 2,714,555  8/1955  Stevenson et al. .................. 423/22
4,411,793  10/1983  Kato et al. ......................... 210/656
4,885,143  12/1989  Schmuckler ....................... 423/222
4,995,984  2/1991  Barkatt ............................. 210/656

FOREIGN PATENT DOCUMENTS

WO 93/18835  9/1993  WIPO .................. B01D 15/08

OTHER PUBLICATIONS

Limoni et al, Journal of Chromatography, vol. 135, pp. 173–182 (1977), no month.

West et al, Analytica Chimica ACTA, vol. 61, No. 2, pp. 277–283 (Sep. 1972).

Patent Abstracts of Japan, vol. 017, No. 037 (C–1019) Jan. 15, 1993 (JP 4–254535).

*Primary Examiner*—Steven Bos
*Attorney, Agent, or Firm*—Pillsbury Madison & Sutro LLP

[57] ABSTRACT

This invention relates to a method of interseparation of platinum group metals, and in particular to the use of chromatographic media for interseparation of the PGMs from a reduced feed which are eluted in the order of iridium, rhodium and ruthenium together, followed by palladium, platinum and osmium.

15 Claims, 12 Drawing Sheets

Separation of a Reduced PGM Feed.

FIGURE 1
Repeat of Example 2 of US 4,885,143 using 1M HCl Eluent.

FIGURE 3

Repeat of Example 2 of US 4,885,143 using 1M HCl Eluent.
Ruthenium chromatogram FIGURE 4
Repeat of Example 2 of US 4,885,143 with 0.5% Sodium Chlorate Added as Oxidant to the Eluent.

FIGURE 6
Separation of a Reduced PGM Feed.

FIGURE 7

Separation of a Reduced PGM Feed.

FIGURE 10
Separation of a Reduced PGM Feed.

FIGURE 11
Separation of a Reduced PGM Feed.

FIGURE 12
Change in Platinum Retention Time with Period of Exposure to 6M HCl.

INTERSEPARATION OF PLATINUM GROUP METALS

This is a continuation of application Ser. No. 08/682,913, filed on Jul. 16, 1996, now abandoned.

BACKGROUND OF THE INVENTION

This invention relates to a method of interseparation of platinum group metals, (PGMs) and in particular to the use of chromatographic media for interseparation of the PGMs from a reduced feed which are eluted in the order of iridium, rhodium and ruthenium together followed by palladium, platinum and osmium.

DESCRIPTION OF THE PRIOR ART

It is known to use hydrophilic gels as chromatographic media for the separation of simple inorganic anions and the interseparation of PGMs. These gels are usually used in the separation of biomolecules by size exclusion. There have been a number of papers published on the use of gel permeation chromatography to extract precious metals: Journal of Chromatography 135 (1977) 173–182, (auth. Limoni, Schmuckler) concerning Pt and Pd and Analytica Chimica Acta, 61 (1972) 277–283, (auth. Kitayevitch, Rona, Schmuckler) concerning Ru, for example. U.S. Pat. No. 4,885,143 (Schmuckler) describes a method in which the interseparation of the PGMs from an oxidised, gold-free halide solution is achieved using a chromatographic medium, such as a polysaccharide gel (SEPHADEX) or a polyacrylamide gel (BIOGEL). SEPHADEX is a trademark of Pharmacia Biotech and BIOGEL is a trademark of Bio-Rad Laboratories. The PGMs, when dissolved in a chloride solution, form complexes, wherein at least the iridium and ruthenium ions are in the tetravalent oxidation state, which are adsorbed onto the chromatographic medium and are claimed to be eluted selectively in the order ruthenium, rhodium, palladium, platinum, iridium and caesium, although it is clear from the rest of her patent that Schumuckler meant osmium. There are disadvantages to this method; in particular we have found there is no clean separation of the PGMs, and the chromatographic media denature over a period of time which results in a steadily decreasing separation of the PGMs and consequently the media have a limited effective lifetime.

SUMMARY OF THE INVENTION

The present invention has sought to overcome this problem by providing an improved method for the interseparation of platinum group metals.

The present invention provides a method for the interseparation of PGMs from a PGM-containing halide feed solution comprising the steps of passing the solution through a chromatographic medium and adsorbing the PGMs onto the medium, eluting each PGM using an eluent to obtain separate fractions, each fraction containing at least one PGM characterised in that at least the iridium and ruthenium ions in the PGM-containing halide feed are in the trivalent oxidation state.

DESCRIPTION OF THE PREFERRED EMBODIMENTS

The chromatographic medium used may be any suitable chromatographic medium but is suitably a glycol methacrylate, a polysaccharide gel (eg SEPHADEX) or a polyacrylamide gel (eg BIOGEL). Preferably, the chromatographic medium is a glycol methacrylate.

The glycol methacrylate chromatographic medium is preferably a co-polymer of ethylene glycol and methacrylic acid (for example a medium from the MACRO-PREP (trademark of Bio-Rad Laboratories) range of chromatographic media) or a co-polymer of oligoethyleneglycol, glycidylmethacrylate and pentaerythroldimethacrylate (for example a medium from the TOYOPEARL (trademark of TosoHaas and previously known as FRACTOGEL) range of chromatographic media). The presence of ether linkages in the polymer and hydroxyl groups confer a highly hydrophilic nature to both the outer and internal surfaces of the gel particles.

Most preferably the medium is from the TOYOPEARL range of chromatographic media. This medium has been known for use in the separation of biomolecules but the advantages for use in the interseparation of PGMs had not been previously realised. Advantages of this medium over SEPHADEX and BIOGEL include an improved lifetime in acidic media and the fact that a greater pressure can be applied which permits the use of higher flow rates. The last mentioned property is of considerable benefit in the scaling up of the chromatographic process because high pressure can be applied to a column containing the medium to achieve high flow rates. This requires less material which is reflected in a reduction in cost of the process.

The eluent may be any eluent known for use in the chromatography of inorganic solutes. For example, the eluent may be an acidic solution, such as hydrochloric acid. The strength of the hydrochloric acid is not important and down to very dilute concentrations can be used. However, the inventors have found that an approximately 6M solution gives beneficial results. 6M hydrochloric acid is the composition of the $HCl/H_2O$ azeotrope, and consequently the eluent can be readily separated and recycled. Another advantage of using a strong hydrochloric acid eluent is that the retention times of $[PdCl_4]^{2-}$ and the tetravalent hexachloro PGM complexes are increased and this improves the interseparation. The use of this eluent also has the advantage that due to differences in the species formed at high chloride concentration, the ruthenium (III) peak is significantly sharper and so does not overlap the palladium peak. Alternatively, the eluent may be an inorganic salt solution such as a chloride solution or a perchlorate solution. Alternatively, the eluent may be water.

The interseparation may be carried out using a chromatographic medium using polymer beads of any particle size. However, suitably, the medium has beads of particle size of from 32 to 300 $\mu$m, and preferably of from 50 to 180 $\mu$m, most preferably from 50 to 100 $\mu$m.

The invention further provides a method for the interseparation of PGMs wherein elution of each adsorbed PGM is achieved under reducing conditions and in the order of iridium, rhodium and ruthenium together, followed by palladium, platinum and osmium.

The interseparation process may be carried out using known chromatographic techniques, for example a batch column, a simulated moving bed chromatograph, a continuous annular chromatograph or a "Gatling gun" chromatograph as described in more detail below.

In a batch column chromatograph, the chromatographic media is contained in a single column. An aliquot of feed is loaded onto the column and then eluted. A valve arrangement is employed to switch the output so that the various products are collected in separate fractions. This is by far the most commonly used preparative chromotographic technique.

With a simulated moving bed chromatograph, the chromatographic media is contained in a number of columns connected in series via an arrangement of valves. Eluent is fed in at one end and flows counter-current through the columns until it emerges at the last but one column. The last column is isolated from the rest and is eluted separately using a purge stream. The feed joins the eluent as it flows into one of the columns in the middle. At regular intervals the valves are switched so that the positions of the eluent, feed and purge are all shifted along one column. By this technique a solute which is less strongly retained will flow with the eluent along the columns and in due course emerge in the eluate stream. A more strongly retained solute will remain with the column and move in the opposite direction until it is removed from the column by the purge. The most common example is UOP's SORBEX Chromatograph.

With a continuous annular chromatograph, the chromatographic media is enclosed in the annulus between two cylinders. The feed is fed into the top of the bed at a fixed point on the circumference whilst eluent flows in all the way round the rest of the annulus. The annulus is rotated with the result that the separated solutes emerge from the bottom of the annulus at different angular displacements relative to the feed point. Most of the work on continuous annular chromatographs has been carried out at Oak Ridge National Laboratories.

A "Gatling gun" chromatograph is similar to the continuous annular chromatograph except the chromatographic media is contained in a number of columns arranged in a circle instead of an annulus. The most common unit is the ISEP system from Advanced Separation Technologies Incorporated.

The invention will be described with reference to examples which are illustrative of but are not limiting of the invention.

EXAMPLE 1

Repetition of Example 2 of U.S. Pat. No. 4,885,143

U.S. Pat. No. 4,885,143 gives the order of the PGM as being Ru, Rh, Pd, Pt, Ir and Cs (sic). In Example 2 the species are given as being $[RuCl_6]^{2-}$, $[RhCl_6]^{2-}$, $[PdCl_4]^{2-}$, $[PtCl_6]^{2-}$, $[IrCl_6]^{2-}$ and $[OsCl_6]^{2-}$. The rhodium species is wrong and should be $[RhCl_6]^{3-}$. The very quick elution reported for the ruthenium is inconsistent with the species being $[RuCl_6]^{2-}$. This species would be expected to be retained like the other tetravalent hexachloro complexes and to have a similar elution volume to $[OsCl_6]^{2-}$ as both metals are in the same group of the Periodic Table. In Table 2 of U.S. Pat. No. 4,885,143 the distribution coefficient ($K_d$) for $[RuCl_6]^{2-}$ is reported to be 0.33. This indicates that the ruthenium was present as a species which was too large to enter all of the pores of the gel and, unlike the other PGMs, was being separated by a size exclusion mechanism.

Both $[IrCl_6]^{2-}$ and $[RuCl_6]^{2-}$ are only formed at high oxidation potentials and are therefore easily reduced. The gels are organic and therefore likely to be reducing in nature. As a result the iridium and ruthenium would be expected to be reduced on the column. The trivalent complexes formed would be expected to behave in similar way to the trivalent rhodium. They would therefore elute quickly and overlap the other PGMs.

Under similar conditions to the above Example 2, a solution containing 313 mgl⁻ of Ir, Os, Pd, Pt, Rh and Ru in 1M HCl was used. The salts used were:

Ir Ammonium hexachloroiridate(IV) $(NH_4)_2[IrCl_6]$
Os Sodium hexachloroosmate(IV) $Na_2[OsCl_6]$
Pd Ammonium tetrachloropalladate(II) $(NH_4)_2[PdCl_4]$
Pt Ammonium hexachloroplatinate(IV) $(NH_4)_2[PtCl_6]$
Rh Ammonium hexachlororhodate(III) $(NH_4)_3[RhCl_6]$
Ru "Ammonium chlororuthenate(IV)".

Analysis of the ruthenium salt showed that it contained 60% $(NH_4)_2[RuCl_6]$ and 40% $(NH_4)_4[Ru_2OCl_{10}]$. It is normal for a ruthenium(IV) salt to contain a mixture of these two as the solution from which it is prepared will contain a mixture of the two complexes.

A 2 ml sample of this solution was chromatographed on a 300×10 mm SEPHADEX G-10 column with an eluent flowrate of 1.5 ml min⁻¹. The outlet from the column was connected directly to an inductively-coupled plasma spectrophotometer. The signal intensities were recorded at 10-second intervals and then converted to mgr⁻¹ which enable the peaks to be accurately defined. In the above Example 2, 5 ml samples were collected and then analysed but the retention volumes were reported to an accuracy of 0.05 ml.

Figure 1:
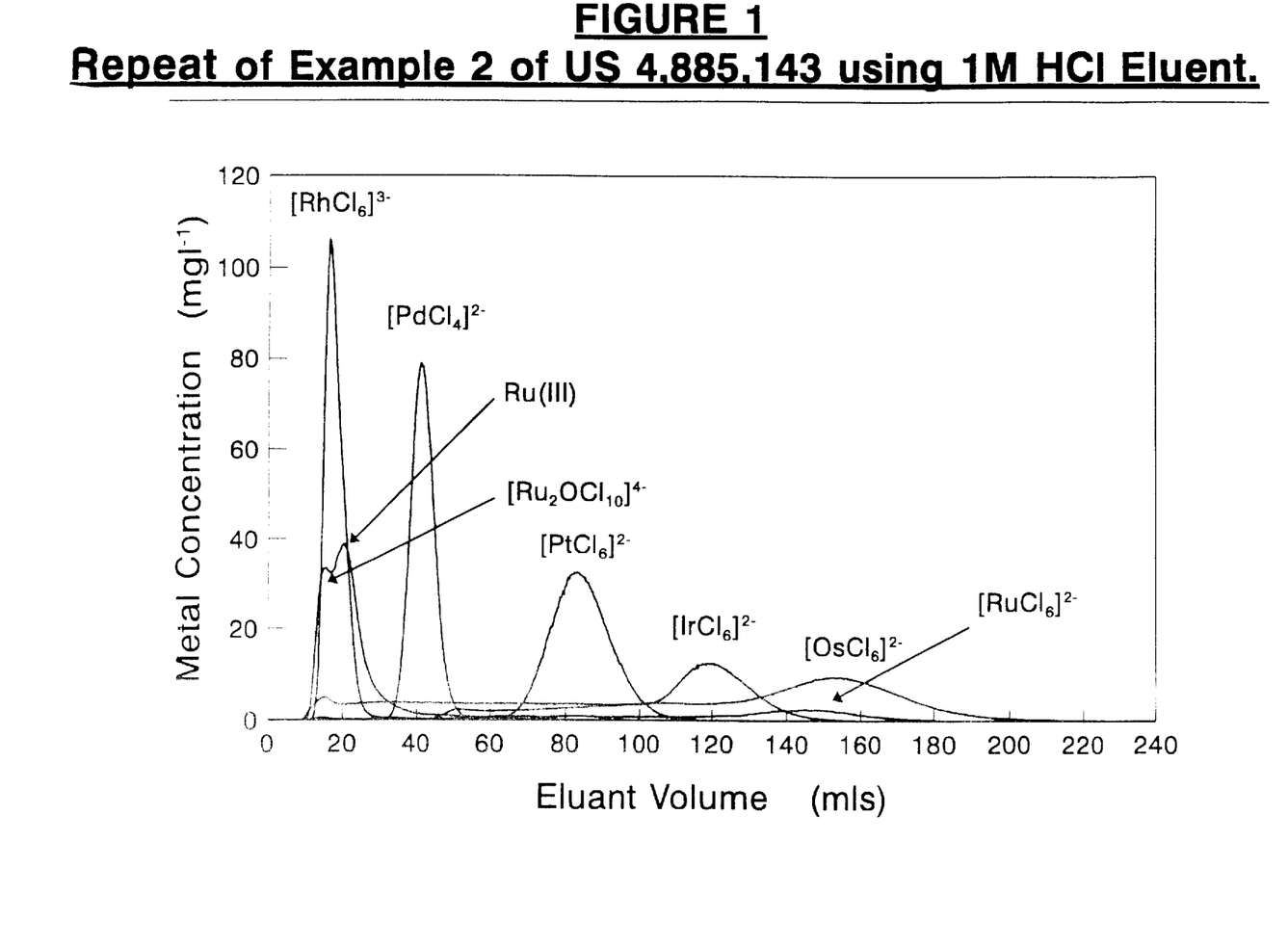
FIGS. 1–4 graphically illustrate the prior art.
Figure 2:
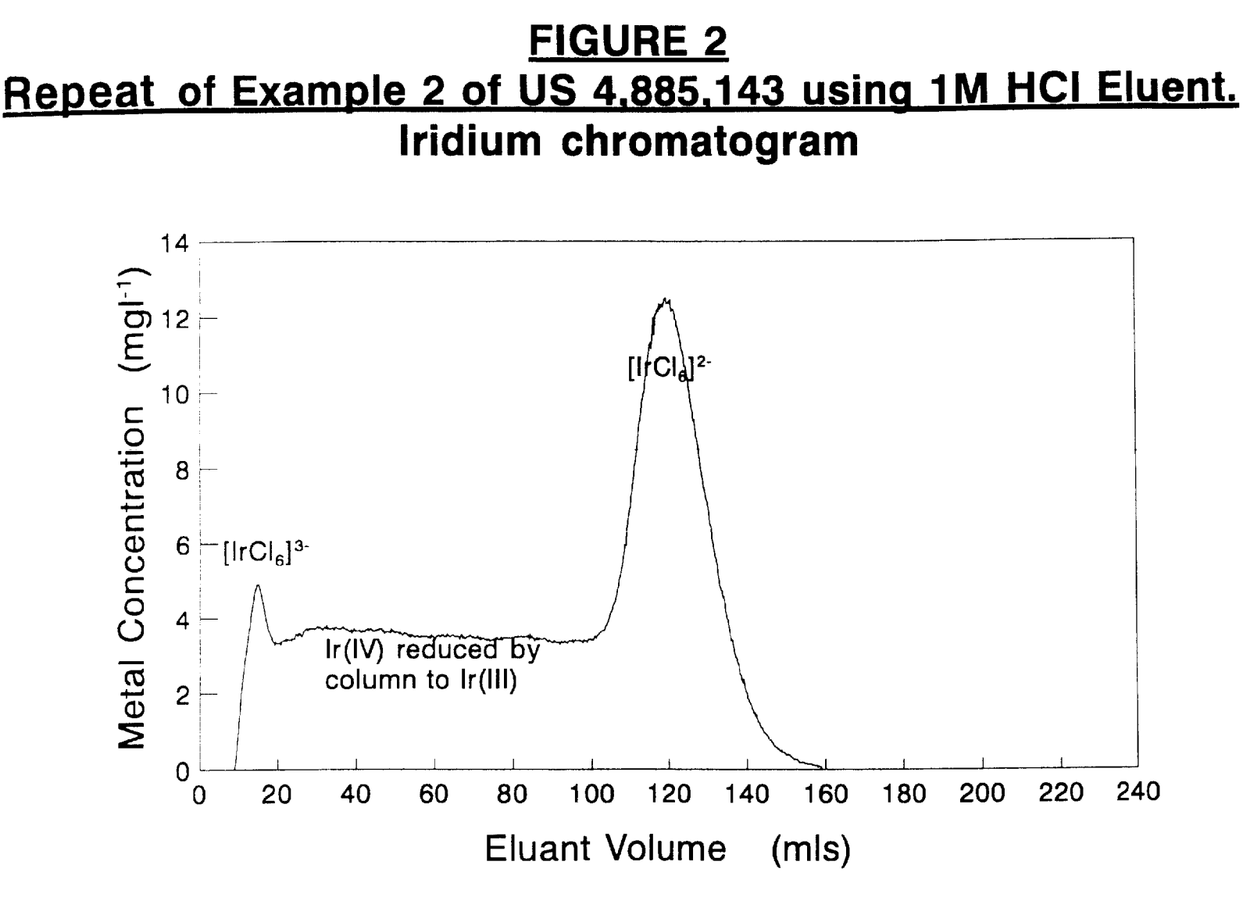
Figure 3:
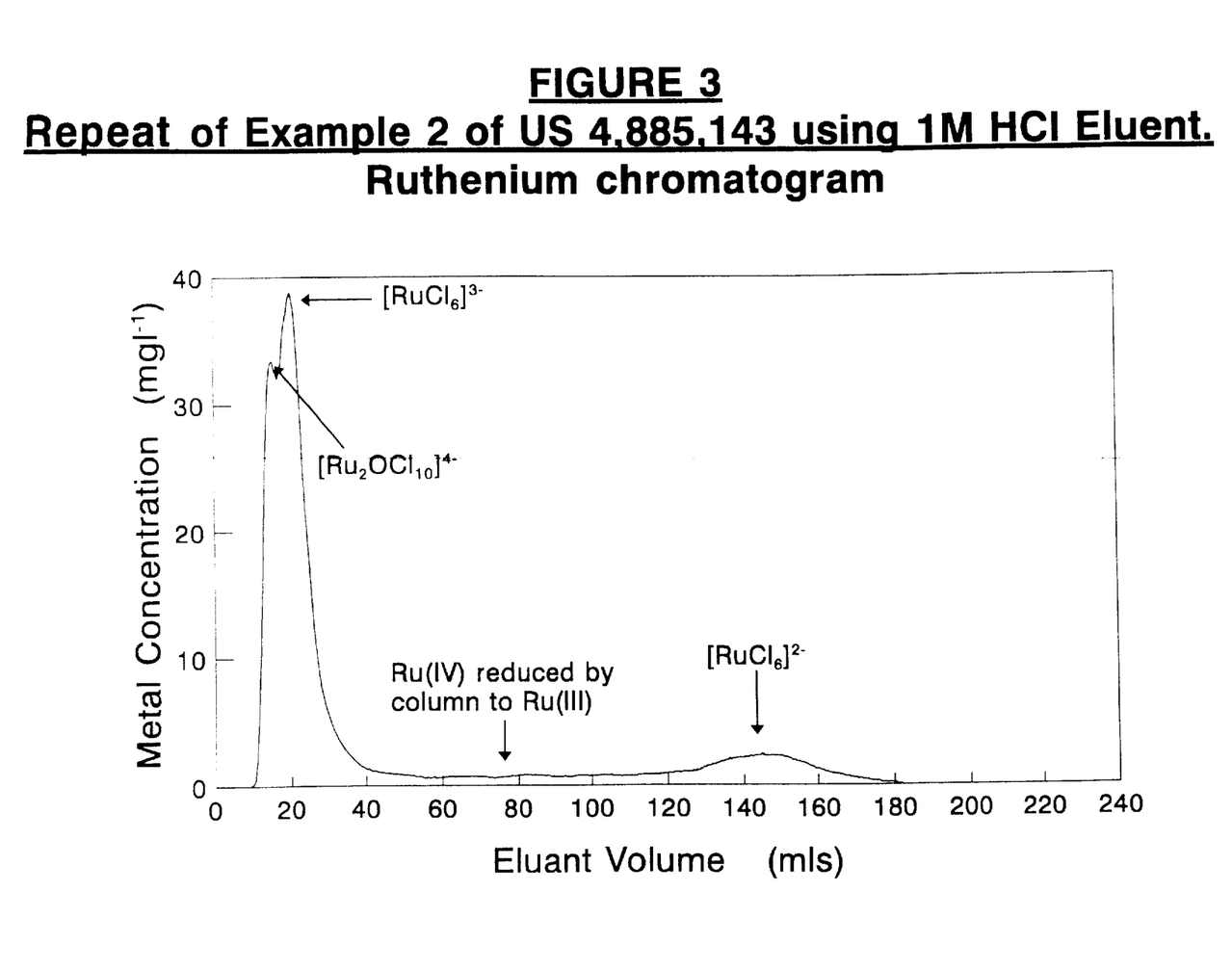
Figure 4:
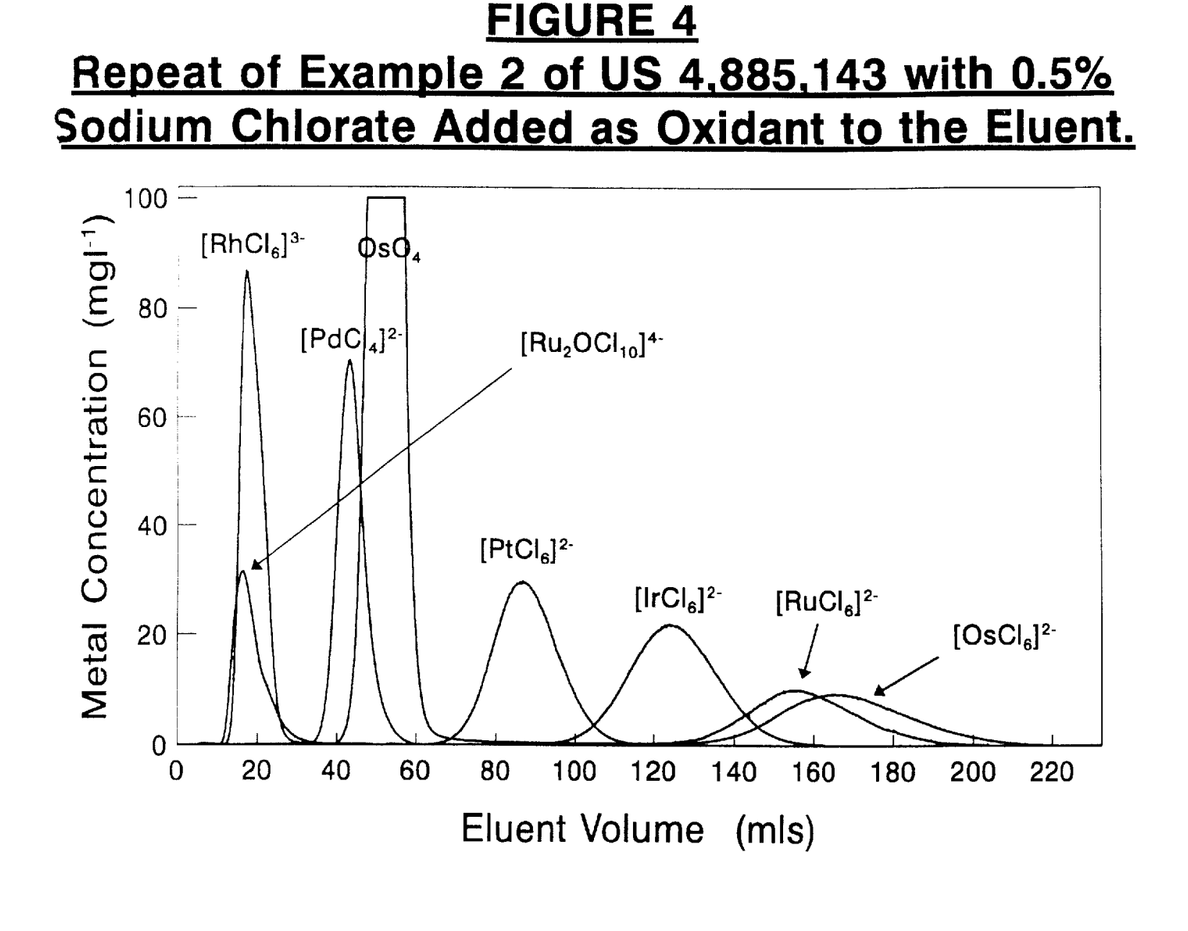

The chromatogram obtained from the repetition of the above Example 2 is shown in FIG. 1. As expected both the $[IrCl_6]^{2-}$ (FIG. 2) and the $[RuCl_6]^{2-}$ (FIG. 3) underwent reduction by the gel. As a result there was a peak with a short retention time due to formation of $[MCl_6]^{3-}$, (where M is Ir or Ru). This was followed by a steady bleed of iridium and ruthenium formed by reduction as the $[MCl_6]^{2-}$ peaks moved down the column and then finally a peak due to the remaining $[MCl_6]^{2-}$ which had not reduced on the column. The peak due to $[Ru_2OCl_{10}]^{4-}$ was only weakly retained and overlapped the rhodium peak showing that this was not the species in the solution of U.S. Pat. No. 4,885,143 Example 2. Reduction of this species is very slow at room temperature as it involves cleavage of the dimer and so reduction by the column was negligible. As expected the unreduced $[RuCl_6]^{2-}$ remaining overlapped the $[IrCl_6]^{2-}$ and $[OsCl_6]^{2-}$ peaks. This can be more clearly observed in FIG. 4 where 0.5% sodium chlorate was added to the 1M HCl eluent in order to form chlorine in situ in order to produce a highly oxidising environment.

The osmium also showed unusual behaviour in these chromatograms due to the presence of some species other than $[OsCl_6]^{2-}$ in the salt used. Although the shape of the peak in FIG. 1 suggests that reduction of osmium (IV) was also occurring on the column, this was not the case as osmium(III) only forms under extremely reducing conditions. When sodium chlorate was added to the eluent (FIG. 4) these unknown osmium species were oxidised to osmium tetroxide which then volatilised into the plasma gas stream and gave considerable enhancement of the signal which is observed.

The overall result of carrying out an interseparation of PGMs as described in Example 2 of U.S. Pat. No. 4,885,143 (ie using a solution containing $[RuCl_6]^{2-}$) is that Ir(IV) and Ru (IV) will be reduced on the column. As a result the rhodium, palladium and platinum fractions will be contaminated with both iridium and ruthenium, whilst the iridium and particularly the osmium fractions will be contaminated by ruthenium due to the overlap of the peaks.

The osmium in the palladium and platinum fractions in our repeat of Example 2 is an artefact of the salt we used. Had a salt which only contained $[OsCl_6]^{2-}$ as in U.S. Pat. No. 4,885,143 been used, then this contamination would not have occurred. Similarly had the ruthenium salt used not contained $[Ru_2OCl_{10}]^{4-}$ then this peak would not be overlapping the rhodium peak. There would, however, still be the Ru (III) peak formed by reduction on the column which also overlaps rhodium.

If a reduced PGM feed, i.e., where the iridium and ruthenium are in the trivalent oxidation state is employed, palladium, platinum and osmium fractions are obtained, whilst rhodium, iridium and ruthenium come out in the same fraction and can then be separated by other conventional techniques.

EXAMPLE 2

Interseparation of PGMs Using a Reduced Feed

The interseparation of PGMs was carried out using the following chromatographic media and eluents.

Figure 5:
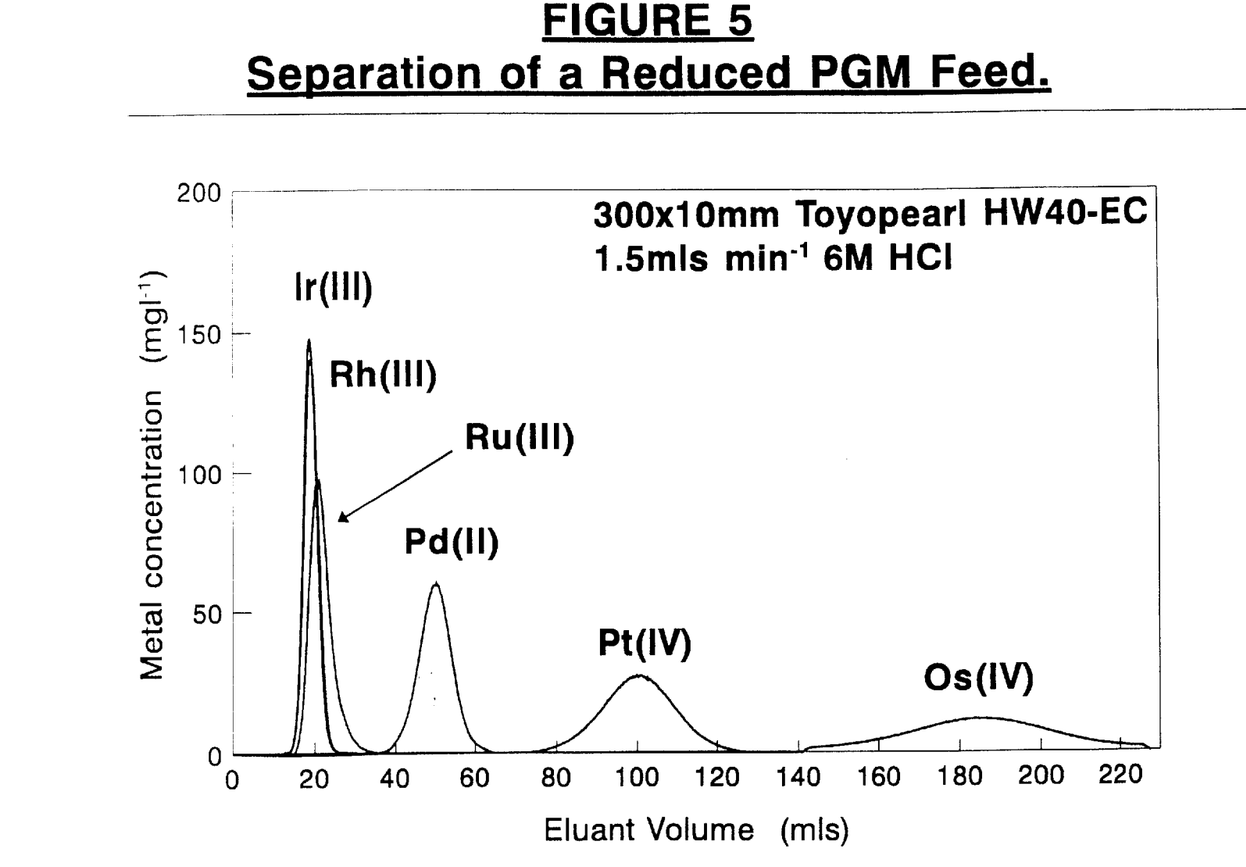
FIGS. 5–12 graphically illustrate various aspects of the invention.
Figure 6:
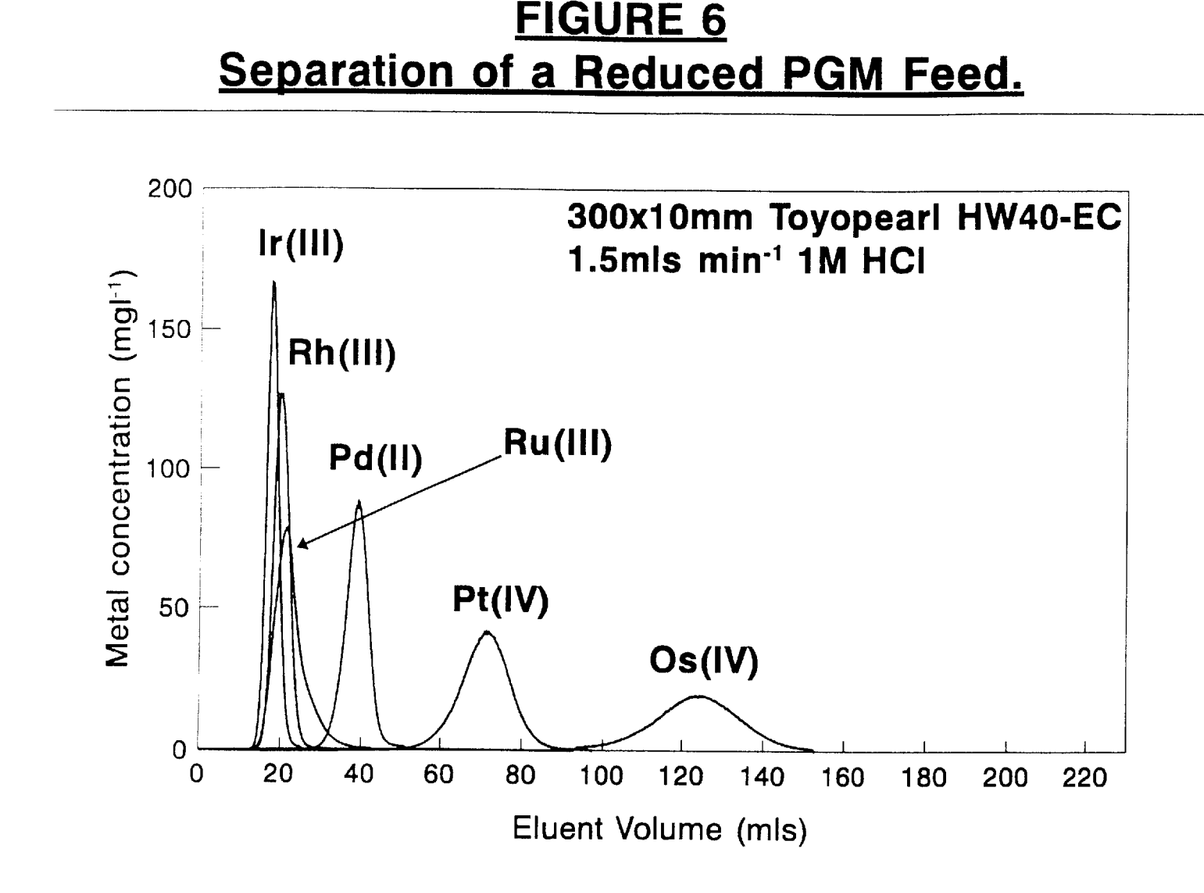
Figure 7:
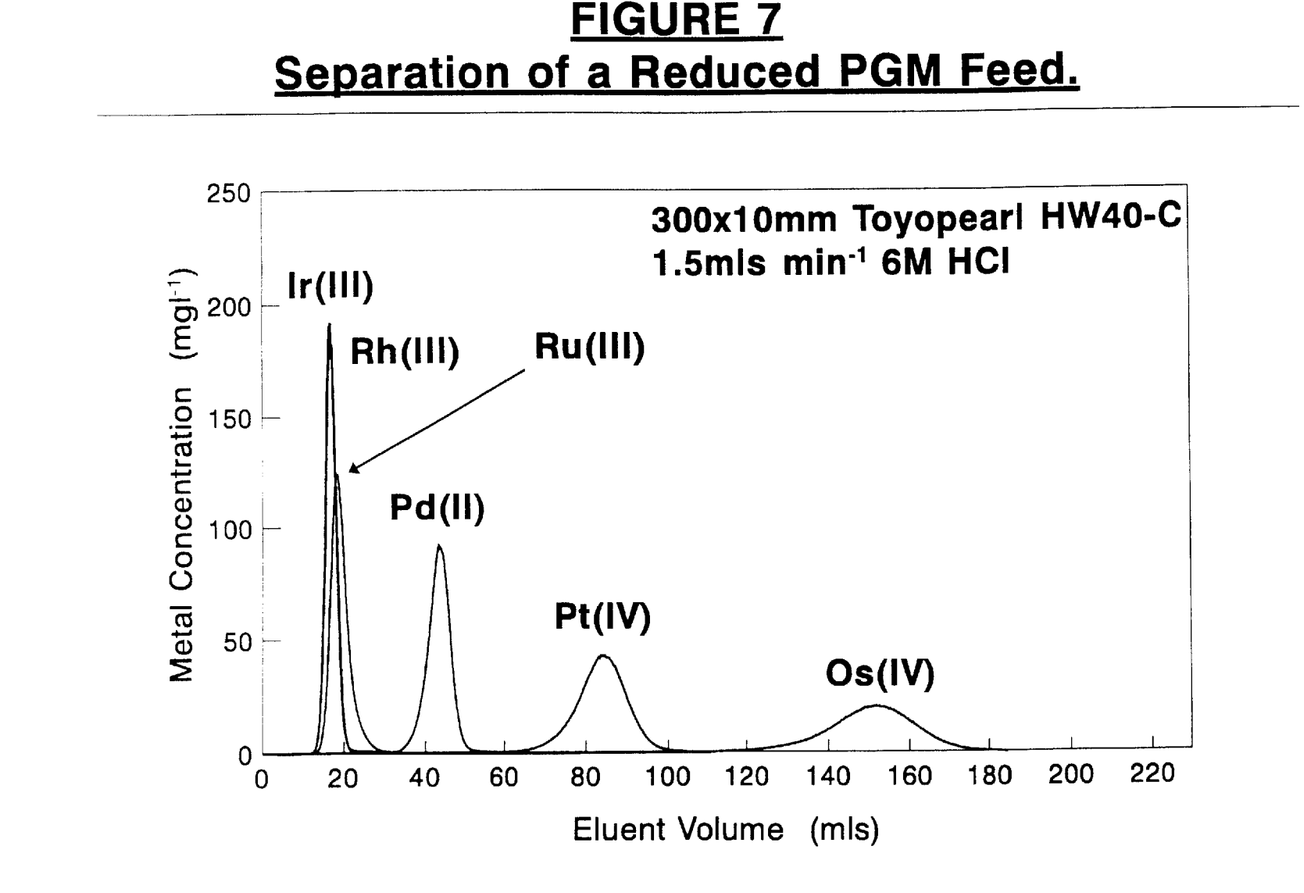
Figure 8:
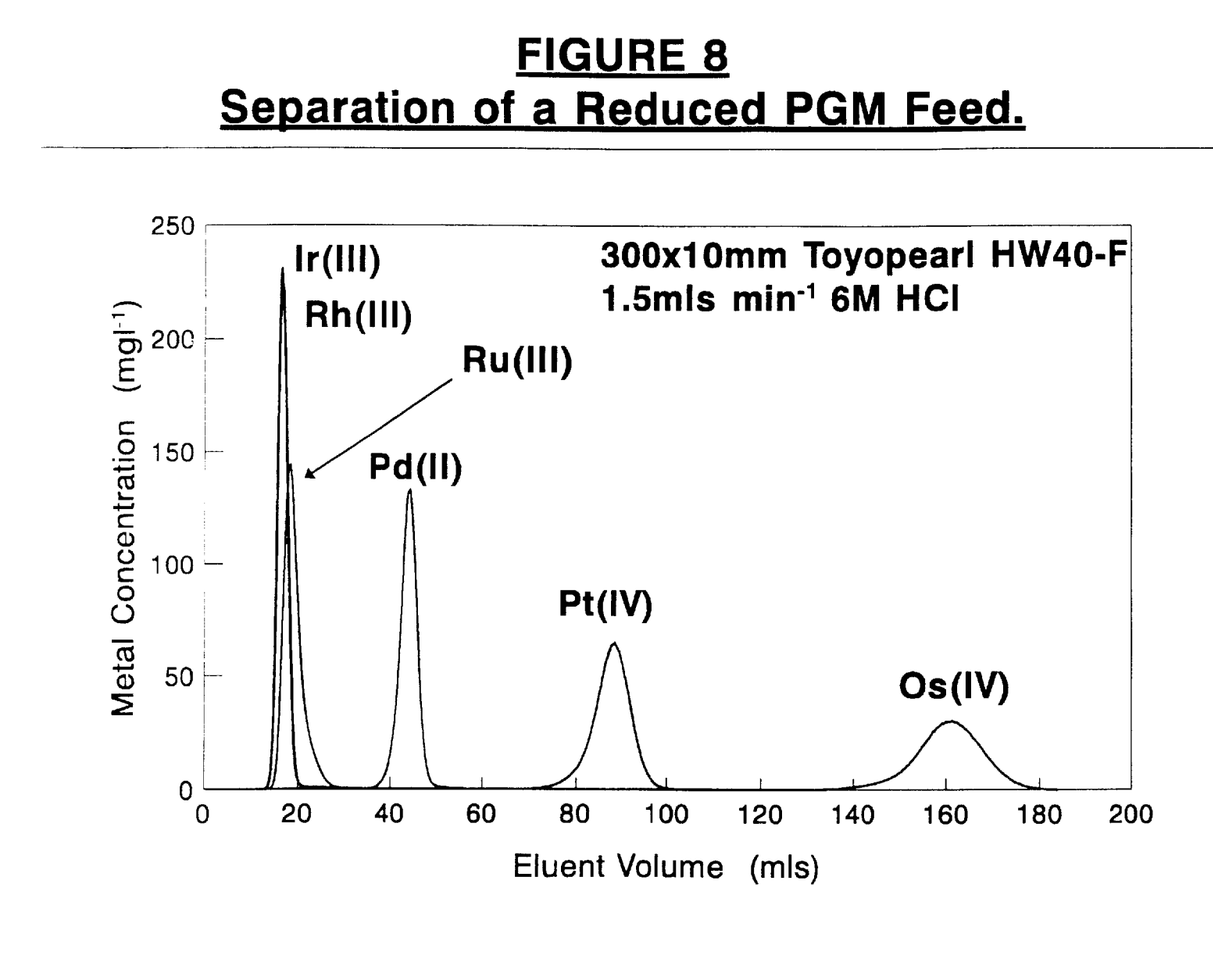
Figure 9:
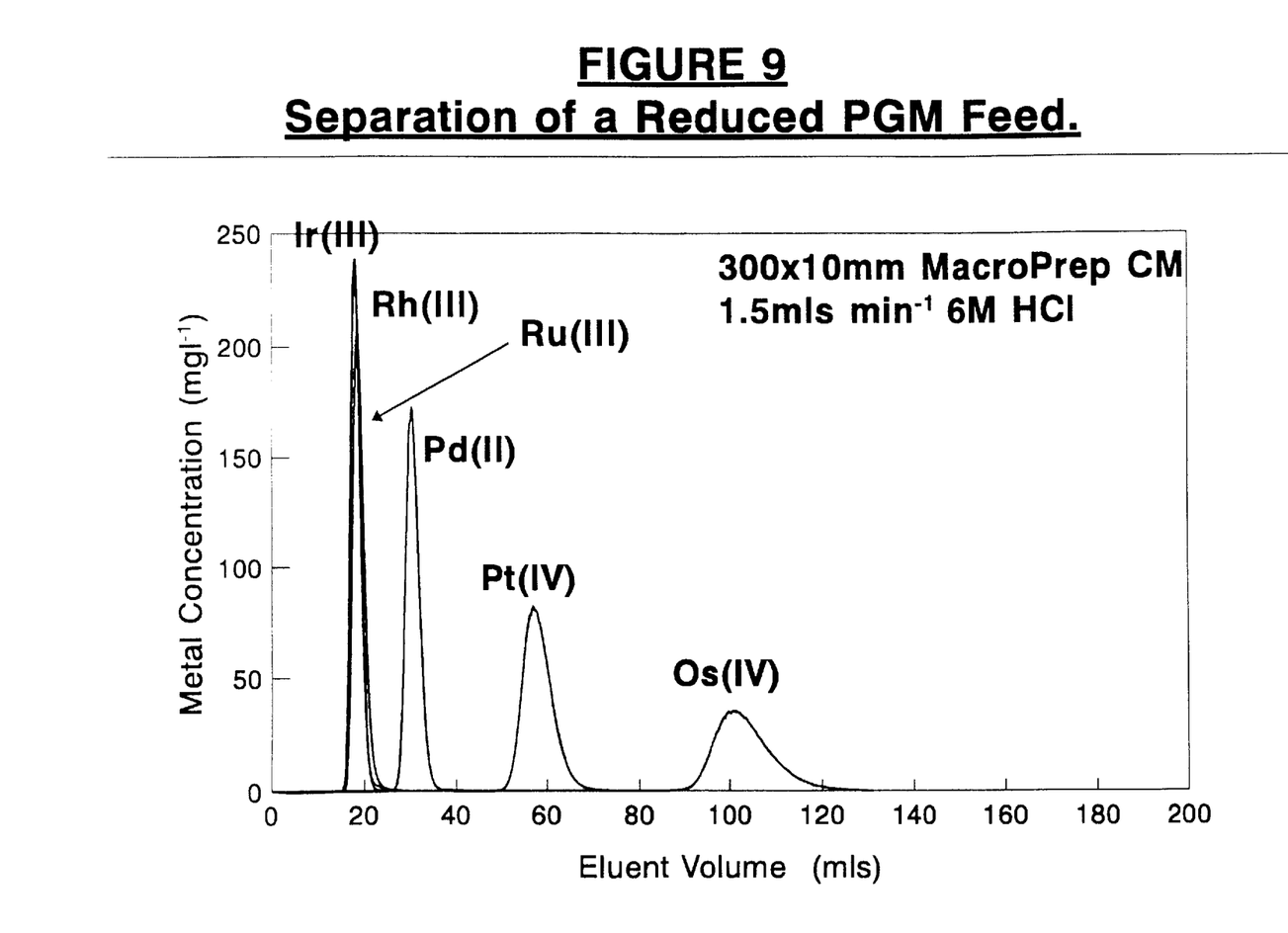
Figure 10:
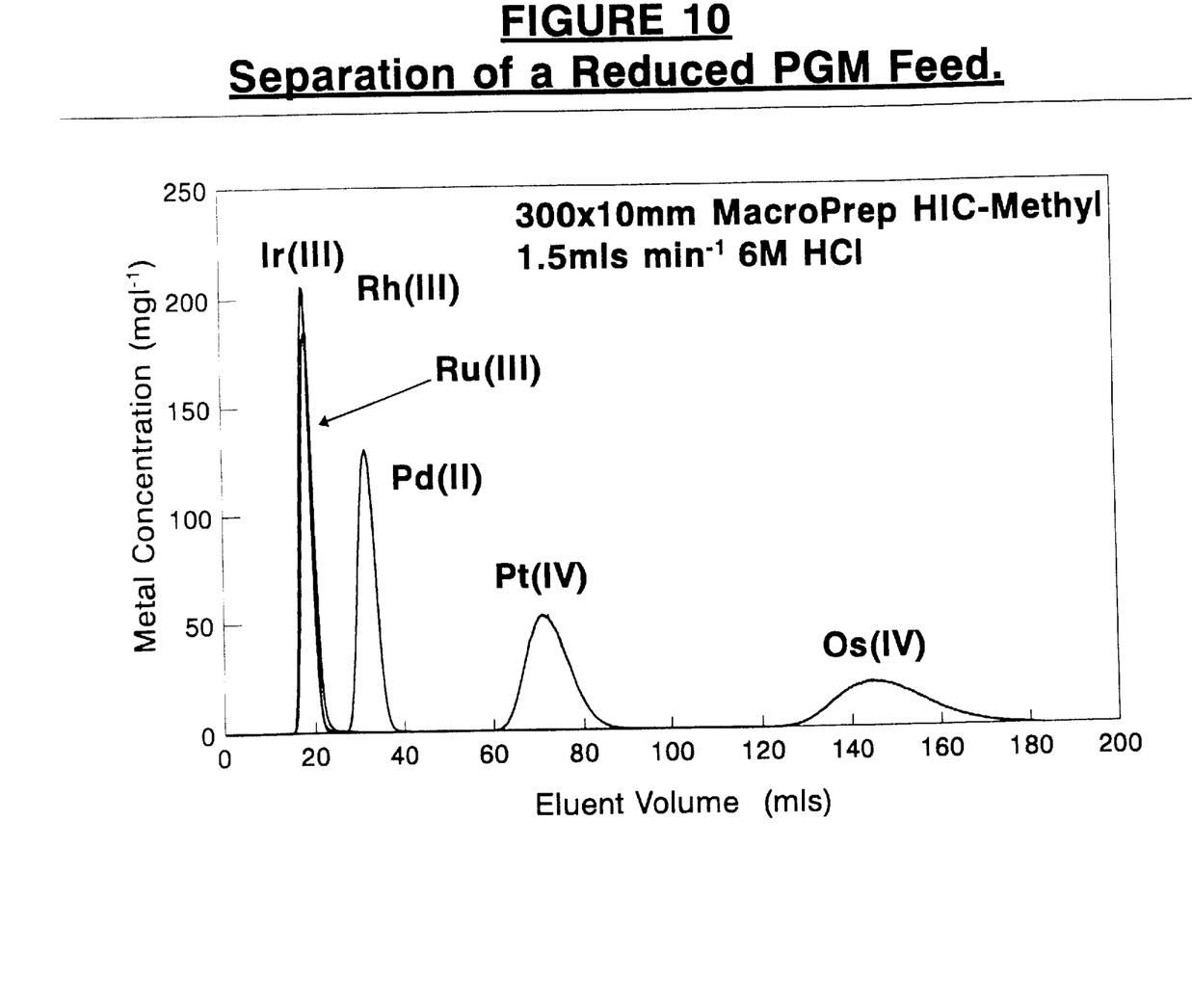
Figure 11:
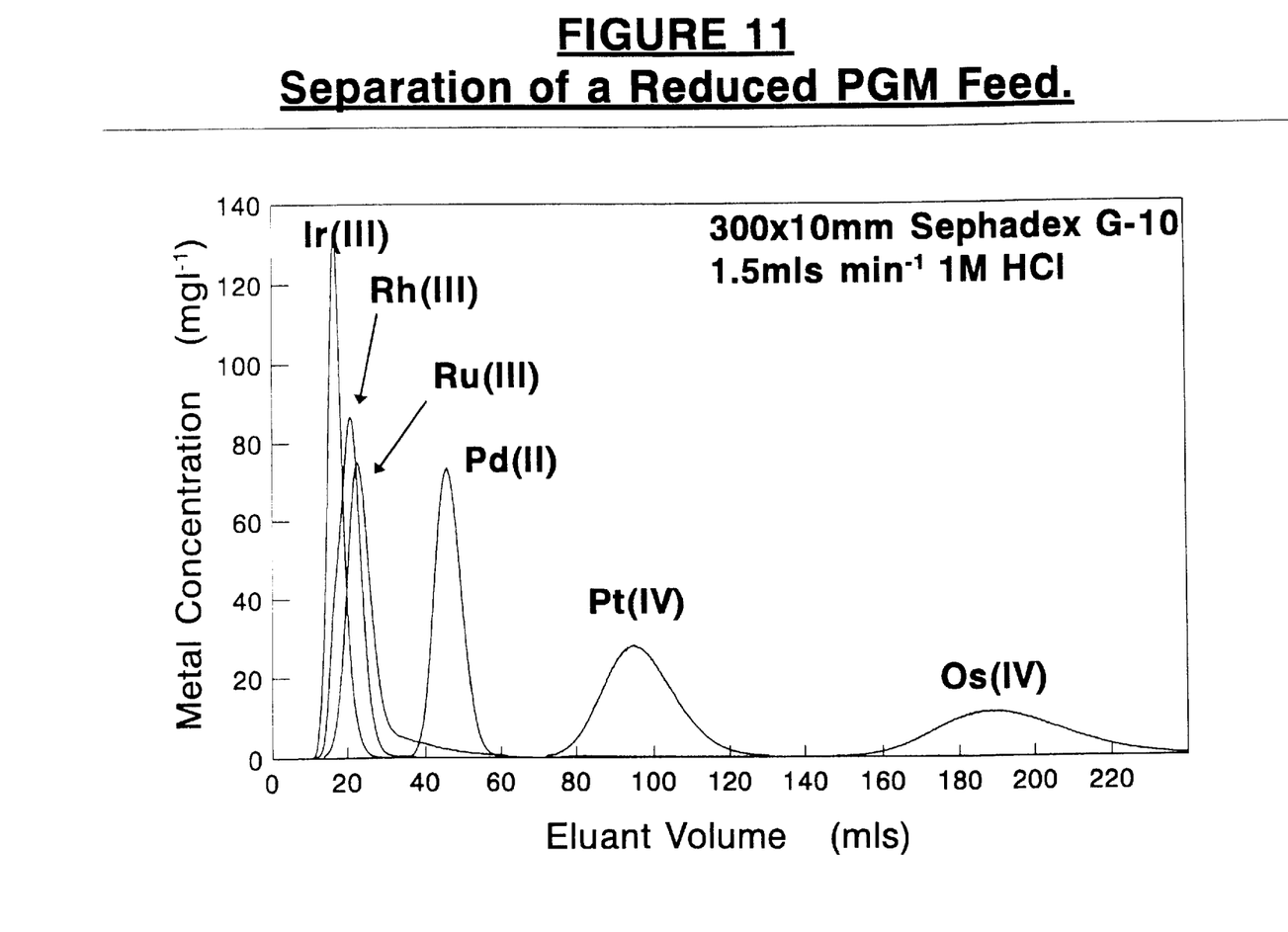

| | | |
|---|---|---|
| A. | Medium: | TOYOPEARL HW40-EC |
| | Eluent: | 6M HCl |
| | Flow rate: | 1.5 ml min$^{-1}$ |
| | Bed size: | 300 × 10 mm |
| | Chromatogram: | FIG. 5 |
| B | Medium: | TOYOPEARL HW40-EC |
| | Eluent: | 1M HCl |
| | Flow rate: | 1.5 ml min$^{-1}$ |
| | Bed Size: | 300 × 10 mm |
| | Chromatogram: | FIG. 6 |
| C. | Medium: | TOYOPEARL HW40-C |
| | Eluent: | 6M HCl |
| | Flow rate: | 1.5 ml min$^{-1}$ |
| | Bed Size: | 300 × 10 mm |
| | Chromatogram: | FIG. 7 |
| D. | Medium: | TOYOPEARL HW40-F |
| | Eluent: | 6M HCl |
| | Flow rate: | 1.5 ml min$^{-1}$ |
| | Bed Size: | 300 × 10 mm |
| | Chromatogram: | FIG. 8 |
| E. | Medium: | MACROPREP |
| | Eluent: | 6M HCl |
| | Flow rate: | 1.5 ml min$^{-1}$ |
| | Bed Size: | 300 × 10 mm |
| | Chromatogram | FIG. 9 |
| F. | Medium: | MACROPREP HIC-Methyl |
| | Eluent: | 6M HCl |
| | Flow rate: | 1.5 ml min$^{-1}$ |
| | Bed Size: | 300 × 10 mm |
| | Chromatogram | FIG. 10 |
| G. | Medium: | SEPHADEX G-10 |
| | Eluent: | 1M HCl |
| | Flow Rate: | 1.5 ml min$^{-1}$ |
| | Bed Size: | 300 × 10 mm |
| | Chromotagram: | FIG. 11 |

The two chromatographic media used in the following Examples were SEPHADEX G10 and BIOGEL P2(f). These are the most rigid, least porous and most coarse grades of SEPHADEX and BIOGEL that are available, having respective wet particle size ranges of 55–166 μm and 45–90 μm. TOYOPEARL HW40-EC and HW40-F are also used in the following examples.

EXAMPLE 3

Lifetime in Acidic Media

TOYOPEARL HW40-EC (which is a hydrophilic polymer, water compatible, grade 40—extra coarse grade) media was contained in a column having an internal diameter of 10 mm, and a bed depth of an approximately 200 mm. The column remained unchanged after 4 months exposure to flowing 6M HCl, flowing at a rate of 1 ml min$^{1-}$. Furthermore, the back pressure across the column, for a given flowrate, remained unchanged indicating that the integrity of the gel particles was retained. Similarly the platinum retention time remained unchanged.

In static equilibration experiments, the capacity of TOYOPEARL HW40-F (fine grade) for platinum in 6M HCl remained unchanged after being left to stand for 4 months.

Figure 12:
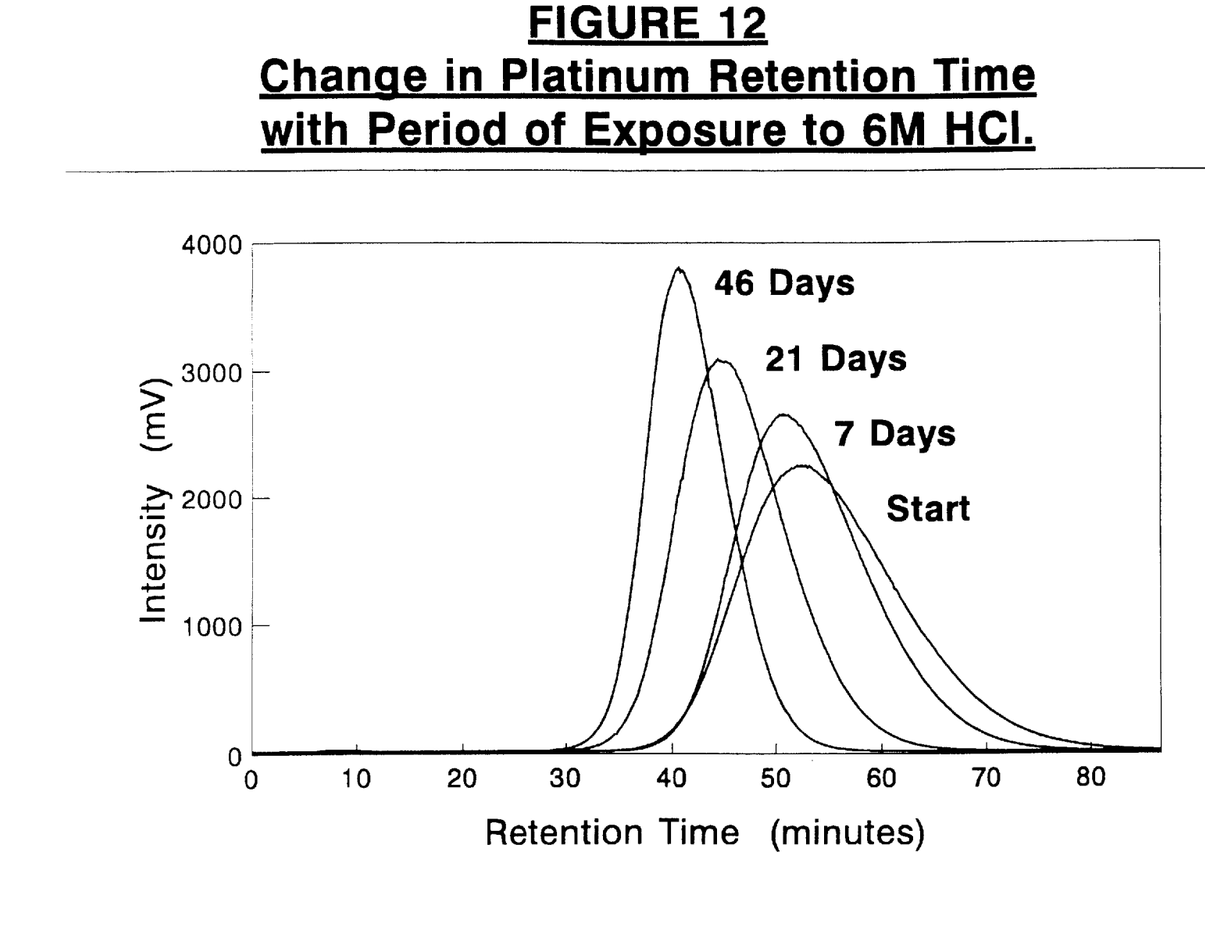

Results for the long term testing of SEPHADEX G10 using 1M HCl in addition to 6M follow. The testing conditions were effectively the same as that for TOYOPEARL. Two columns 10 mm id were packed with a 200 mm bed of SEPHADEX G10. Hydrochloric acid, 1 and 6M respectively, was then pumped through continuously at a flowrate of 1 ml min$^{-1}$. At periodic intervals the retention time of platinum was checked using a test solution containing 20 gl$^{-1}$ platinum (IV) as $[PtCl_6]^{2-}$ and 2 gl$^{-1}$ iridium(III) as $[IrCl_6]^{3-}$. The column exposed to 6M hydrochloric acid showed the greater change and after 46 days the retention time for platinum had decreased from 52.9 to 40.7 minutes (FIG. 12) which equates to a 28.5% degradation (see Table 1 below). The degradation of the column exposed to 1M HCl was slower but had still decreased by 10% after 48 days.

TABLE 1

The Change in Platinum Retention Time and Calculated Percentage Degradation with Period Exposure to 1 and 6M Hydrochloric Acid for SEPHADEX G-10

| Day | Pt(IV) Retention Time (mins) | Ir(III) Retention Time (mins) | Percentage Degradation |
|---|---|---|---|
| 1M HCl column, 0.25 ml sample 20 gl$^{-1}$ Pt, 2 gl$^{-1}$ Ir | | | |
| 0 | 35.7 | 7.2 | 0 |
| 7 | 35.2 | 7.4 | 1.7 |
| 25 | 34.2 | 7.4 | 5.9 |
| 48 | 32.9 | 7.2 | 10 |
| 6M HCl column, 0.25 ml sample 20 gl$^{-1}$ Pt, 2 gl$^{-1}$ Ir | | | |
| 0 | 52.9 | 6.9 | 0 |
| 7 | 50.7 | 7.6 | 6.2 |
| 21 | 44.6 | 7.2 | 19.1 |
| 46 | 40.7 | 7.8 | 28.5 |

Throughout the trial the gel which was exposed to 6M hydrochloric acid steadily expanded and after 21 days the column showed a 5% increase in volume. The degradation also affected the pressure drop across the column and the pressure required to give a flowrate of 1.5 ml min$^{-1}$ had risen from ≦3 psi at the start to 11 psi after 21 days. The 1M acid column had only expanded slightly and there was no measurable change in the pressure drop which remained at less than 3 psi.

Tests on BIOGEL P2 show its volume decreasing by 10% over a week, which we believe to be evidence of degradation. We have also found that BIOGEL turns into a gelatinous mess after several weeks' exposure to 6M HCl.

EXAMPLE 4

Back Pressure

TOYOPEARL offers advantages over SEPHADEX and BIOGEL in terms of pressure. The flowrate through a gel and hence the volume of material which can be processed depends on the pressure applied. Both SEPHADEX and BIOGEL are relatively weak and as the pressure applied increases the gel particles deform and then collapse with the result that the back pressure goes up exponentially. For BIOGEL P2 the maximum recommended pressure is 15 psi.

TOYOPEARL on the other hand is much more robust and can be operated at pressures of up to 7 bar (ca 100 psi) without any problems. Furthermore, TOYOPEARL is available as an extra coarse grade and therefore the pressure drop is consequently lower than for the smaller particles of SEPHADEX or BIOGEL.

We claim:

1. In a method for the interseparation of PGMs from a PGM-containing halide feed solution comprising the steps of passing the solution through a chromatographic medium and adsorbing the PGMs onto the medium, and eluting each PGM with an eluent to obtain separate fractions, each fraction containing at least one PGM, the improvement wherein the order of elution is Ir, Rh and Ru together followed by Pd, Pt and Os.

2. A method according to claim 1, wherein the chromatographic medium is a glycol methacrylate.

3. A method according to claim 2, wherein the glycol methacrylate is a co-polymer of ethylene glycol and methacrylic acid.

4. A method according to claim 2, wherein the glycol methacrylate is a co-polymer of oligo ethylene glycol, glycidylmethacrylate and pentaerythroldimethacrylate.

5. A method according claim 1, wherein the chromatographic medium is a polysaccharide or polyacrylamide gel.

6. A method according to claim 1, wherein the eluent is an acidic solution.

7. A method according to claim 6, wherein the acidic solution is hydrochloric acid.

8. A method according to claim 7, wherein the hydrochloric acid is of approximately 6M strength.

9. A method according to claim 1, wherein the eluent is an inorganic salt solution.

10. A method according to claim 9, wherein the inorganic salt solution is sodium chloride.

11. A method according to claim 1, wherein the chromatographic medium has beads of particle size of from 32–300 $\mu$m.

12. A method according to claim 11, wherein the beads are of particle size of from 50 to 180 $\mu$m.

13. A method according to claim 1, wherein the interseparation is carried out as a batch or continuous chromatograph process.

14. A method for the interseparation of PGMs from a halide solution comprising the steps of passing the solution through a glycol methacrylate chromatographic medium and absorbing the PGMs onto the medium, eluting each adsorbed PGM with an acidic solution to obtain separate fractions, each fraction containing at least one PGM where the order of elution is Ir, Rh and Ru together followed by Pd, Pt and Os.

15. In a method for the interseparation of PGMs from a PGM-containing halide feed solution comprising the steps of passing the solution through a chromatographic medium and adsorbing the PGMs onto the medium, and eluting each PGM to obtain separate fractions, the improvement wherein the chromatographic medium comprises a glycol methacrylate.

* * * * *